United States Patent [19]

Daniels

[11] 4,260,277
[45] Apr. 7, 1981

[54] BRACKET FOR WOODEN STRUCTURES

[76] Inventor: Phillip D. Daniels, 4979 Lake Bluff Rd., West Bloomfield Township, Oakland County, Mich. 48033

[21] Appl. No.: 73,074

[22] Filed: Sep. 6, 1979

[51] Int. Cl.³ .............................................. F16B 9/00
[52] U.S. Cl. ...................................... 403/235; 52/370
[58] Field of Search .................... 403/232.1, 399, 237, 403/235; 52/370, 702, 715

[56] References Cited

U.S. PATENT DOCUMENTS

| 1,260,531 | 3/1918 | Fiala, Jr. | 403/399 |
| 1,423,991 | 7/1922 | Brooks | 52/370 |
| 1,587,355 | 6/1926 | Raun | 52/370 |
| 1,596,039 | 8/1926 | Whittaker | 52/370 X |
| 1,803,723 | 5/1931 | Murphy | 52/370 X |
| 3,420,019 | 1/1969 | Padilla | 52/715 X |
| 3,921,356 | 11/1975 | Hughes | 52/370 X |
| 4,081,940 | 4/1978 | Hughes | 52/712 |

OTHER PUBLICATIONS

Brochure of Erecto-Pat. Inc., Entitled "Wood Deck Kits".

Primary Examiner—Andrew V. Kundrat
Attorney, Agent, or Firm—H. P. Settle

[57] ABSTRACT

This invention provides a bracket for use in constructing wooden structures, typically a wooden deck for homes. The bracket is intended to interconnect two mutually perpendicular structural elements, such as beams and joists or post and railings. The bracket includes a central web portion, a pair of parallel flanges normal to the web and two support extensions lying in the plane of the web and, in effect, extending the width of the web to provide increased lateral stability. The extensions preferably are cut from the flanges but lie in the plane of the web. The flanges and the extensions have fastener openings in pre-determined patterns to facilitate interconnection of the structural elements by different types of fastners.

2 Claims, 7 Drawing Figures

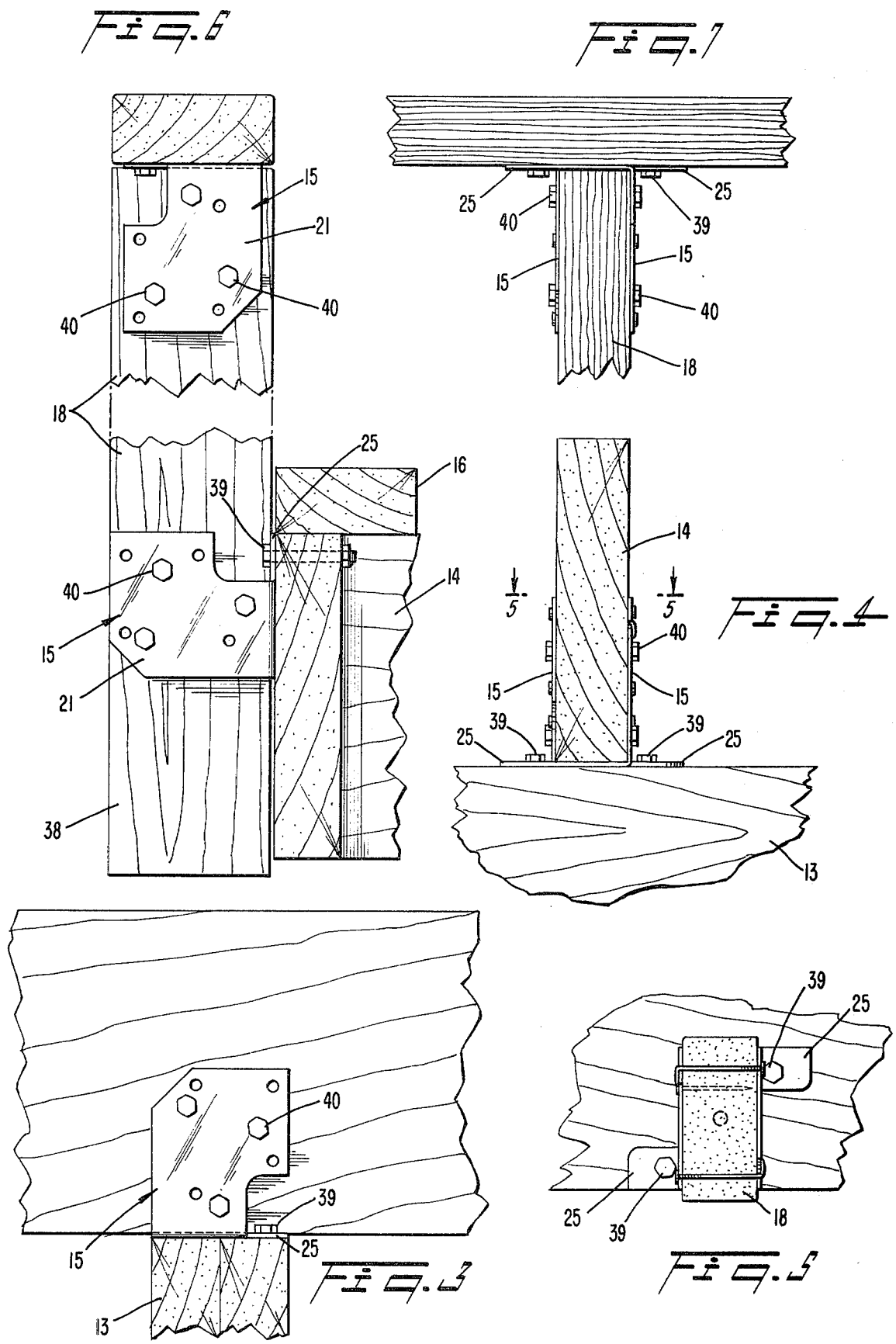

BRACKET FOR WOODEN STRUCTURES

BACKGROUND OF THE INVENTION

In the manufacture of a wooden deck for homes or the like, the deck is constructed from beams supported on ground-engaging posts, and joists extending at right angles to the beams to support the floorboards which run parallel to the beams. The interconnection of the beams and the joists by simply using nails requires carpentry and construction skills normally beyond the experience and dexterity of the average homeowner.

There have been developed and sold, in the past, various "deck kits" which include beam-post connectors and beam-joist connectors which are metallic and which obviate the necessity of construction skills. The type of beam-joist connection previously supplied was a simple "U"-shaped bracket having a lower central web which was nailed to the beam to extend transversely thereof and which had upstanding flanges between which the joist was interposed and then fastened by means of fasteners driven through apertures in the brackets. Such brackets of this simple "U"-shape are no wider than the joist which they support and have very little lateral stability. Further, they must be fastened to the beam by nails driven through the web and struck by a hammer passing between the flanges. Thus, this type of bracket is neither structurally sound nor easily utilized.

In a typical deck installation, a railing about the perimeter of the deck is required. Such a railing normally includes vertical railing posts which are attached to the deck by the same type of U-shaped bracket which is utilized to interconnect the beam and the joist, although the bracket may be provided with a projecting lateral tang of the same width as the bracket web and which is integrally formed with the bracket web. A bracket of this character, when utilized as a railing post bracket, suffers from the same lack of lateral stability as the joist bracket herebefore described.

Thus, it will be seen that within the present state of the art, there is a need for a beam-joist connection bracket of increased lateral stability, and this same need for lateral stability, and this same need for lateral stability exists in the present means for interconnecting deck rail posts to the deck structure and to a peripheral railing. It would be particularly advantageous if the same bracket could be utilized for both purposes, in distinction to the presently used structure which requires specific, individual brackets for each purpose.

BRIEF DESCRIPTION OF THE PRESENT INVENTION

The present invention now provides a multi-purpose bracket which serves to interconnect two mutually perpendicular wooden structural members with enhanced lateral stability. More specifically, the bracket of the present invention can be utilized to interconnect superimposed beam and joist elements, to connect a railing post to a deck structural element at one end and to a peripheral hand rail at the other end, or the bracket can be utilized to interconnect co-planar beams and joists where the joists are interposed separately between adjacent beams, or even as a retainer for a step stringer cut at the desired step angle and abutting a structural member of a deck or the like.

The versatile bracket of the present invention has a central web which is integrally formed with upwardly extending, generally parallel flanges which are normal to the plane of the web. Co-planar with the web are a pair of lateral extensions which, for reasons of economy in production, are cut from the material constituting the flanges. The web, the lateral extensions, and the flanges are all provided with fastener apertures which are oriented relative to one another in a pre-determined pattern to accommodate either through bolts which traverse both flanges and the intervening structural member, lag screws, or nails which project into the intervening structural member, or elongated nails or spikes which extend completely through the elongated member and are then clinched over at the ends. The nail hole pattern is such that nails driven into the intervening structural member from opposite flanges do interfere with one another, yet certain of the nail holes are aligned with removed portions of the opposite flange to accommodate nails longer than the thickness of the intervening structural member.

In the utilization of the bracket, the web extensions provide lateral stability for the joists or posts which are interposed between the flanges, the fasteners through the extensions being displaced substantially in lateral directions from the geometric center of the supported element to resist such tilting forces. Where the bracket is utilized to connect a hand rail or the like to the upper end of the railing posts, the bracket is inverted so that the lateral extensions provide fastener apertures through which upwardly directed fasteners retain the rail directly on the post.

It will be readily understood that the bracket of the present invention, while herein specifically disclosed for utilization in the erection of wood decks, is also useful in the general construction industry for interconnecting beams and joists, for interconnecting wall studs and rafters, and for other similar purposes. Further, the utilization of specific words of spatial orientation, such as "upper" and "lower", "upwardly directed" and the like are illustrative only, since the bracket can be used, and in fact frequently is used, in inverted or sideways orientation as well as upright. Further, the term "mutually perpendicular" means that the interconnected structural elements are mutually perpendicular in one plane only, i.e. the bracket can be used to interconnect a stair stringer to either a post or beam where the stringer is inclined at an acute angle to the plane of the joist or beam.

ON THE DRAWINGS

FIG. 3 is an enlarged elevational view of a beam and joist connection utilized in the deck of FIG. 1 and incorporating the bracket of the present invention;

FIG. 4 is an end elevational view similar to FIG. 3;

FIG. 5 is a sectional view taken along the plane 5—5 of FIG. 4;

FIG. 6 is a side elevational view of a rail post and rail combination retained in position on the deck of FIG. 1 by brackets of the present invention; and FIG. 7 is a fragmentary end elevational view of the post-rail connection of FIG. 6.

THE PREFERRED EMBODIMENTS

Figure 1:
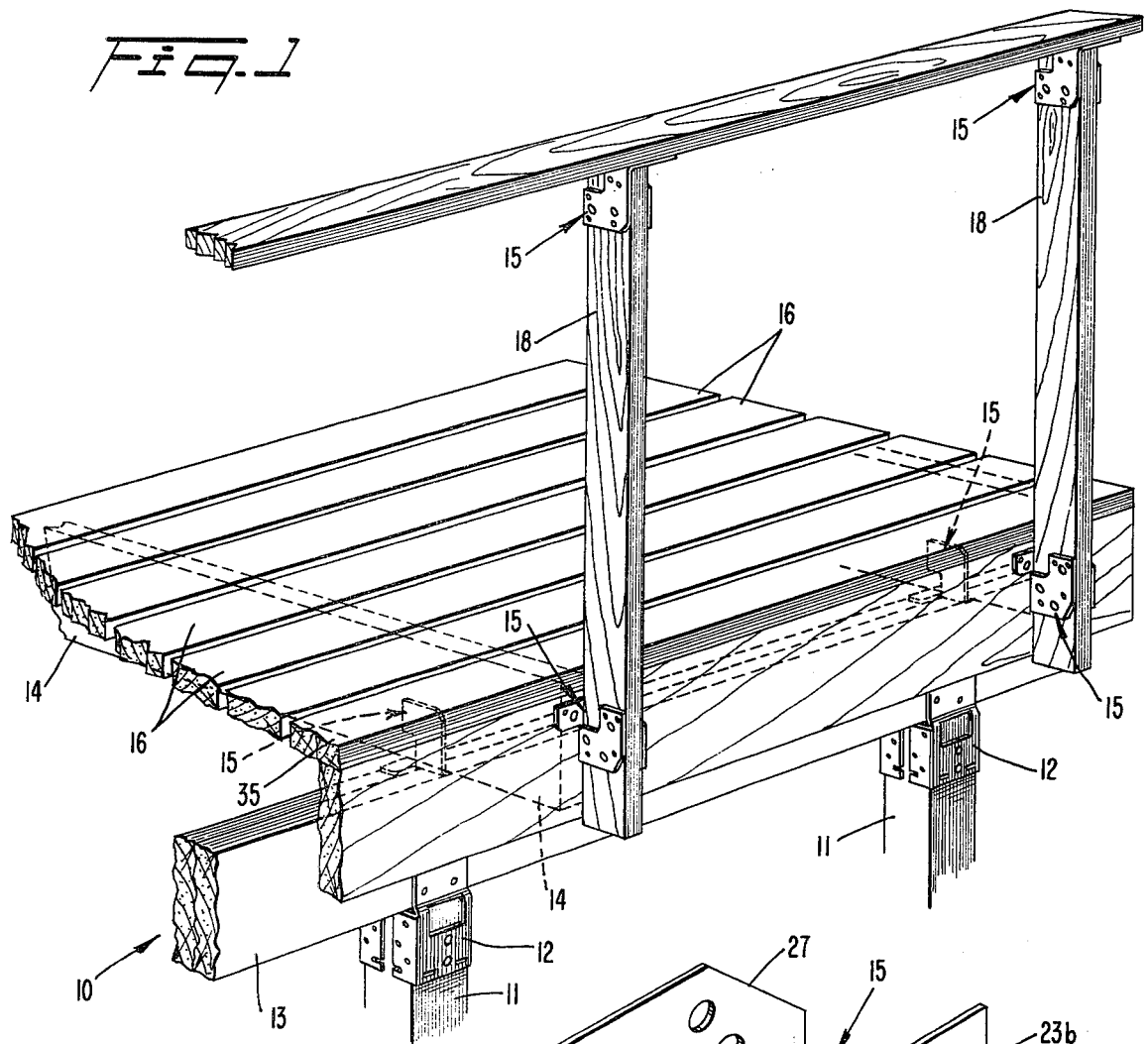
FIG. 1 is an elevational view, shown in perspective, of a deck having beam-joist connections and railing post connections made with the bracket of the present invention.

In FIG. 1, reference numeral 10 refers generally to a deck which is positioned upon vertical, ground-embedded or supported posts 11 connected through elements 12 with a beam 13 which, preferably, comprises a pair of wooden elements in face to face relation. Superimposed on the beam 13 are upstanding joists 14 which are connected to the beam 13 through brackets 15 of the present invention. The deck surface comprises a plurality of edge to edge floor boards 16 which extend parallel to the beams 13 and normal to the joist 14. The perimeter of the deck is defined by a facing board or fascia 17 to which vertical rail posts 18 bear at their upper ends additional connectors 15 which serve to retain a handrail 19 in position on top of the post 18.

Figure 2:
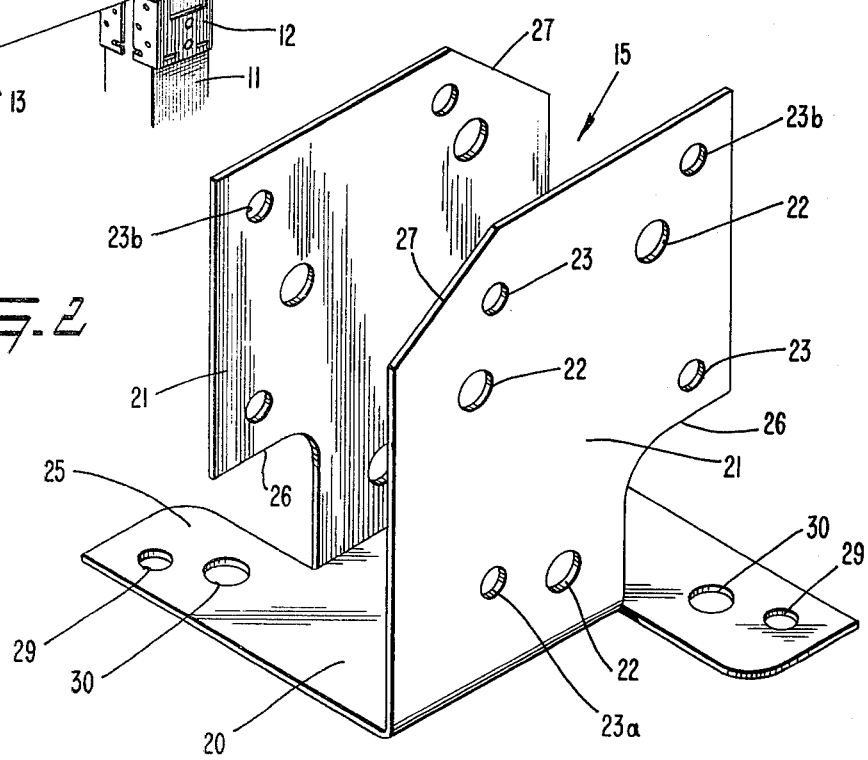
FIG. 2 is an elevational view, shown in perspective, of a bracket of the present invention.

The bracket or connector 15 of the present invention is illustrated in detail in FIG. 2 of the drawings. This bracket 15 comprises a lower, central, planar web 20 of generally rectangular contour and having integrally formed flanges 21 projecting upwardly from the opposite sides thereof. The flanges 21 are provided with spaced, relatively large bolt holes 22, the bolt holes of the opposing flanges being aligned to accommodate the passage of a single bolt therethrough in a manner to be hereinafter more fully described. The flanges also are provided with relatively smaller nail holes 23 which are misaligned with one another so that a nail driven through the nail hole 23 in one flange will not strike a nail driven through the nail hole 23 of the opposite flange, and with nail holes 23a and 23b which are specifically located in a manner later described.

The bracket 15 is also provided with lower, laterally projecting support extensions 25 which are co-planar with the web 20 and which project from the diagonally spaced corner portions of the web 20. For economy, the lateral extensions 25 are cut from the sheet metal material constituting the flanges 21, leaving the recesses 26 in the flanges directly overlying the extensions 25. Each flange 21 is provided with a nail hole 23a which is aligned with the recess 26 on the other side flange. Further, one upper corner of each flange 21 is cut away, as at 27, and one nail hole 23b of each flange 21 is aligned with the cut corner 27 of the other flange, for a purpose to be hereafter more fully described.

In use, and as particularly adapted for the interconnection of a beam 13 to a joist 14, the bracket 15 is utilized in its upright position with the flanges 21 lying at right angles to the length of the beam 13, so that a joist 14 positioned edgewise between the flanges 21 will lie normal to the longitudinal plane of the beam 13. The lateral extension 25 and the web 20 thus lie flat against the exposed upper surface of the beam 13, and nails 28 positioned in nail holes 29 in each extension 25 retain the bracket in position on the beam 13. The extensions 25 also are provided with bolt holes 30 which are somewhat larger than the nail holes 29 and bolts, lag screws, or large head nails can also be utilized to extend through these holes 30 into the beam 13, if necessary or desired.

The upwardly extending flanges 21 receive the transversely extending joist 14 therebetween, and the joists 14 are normally secured in position by means of nails 31 positioned in nail holes 23 and extending into the joists. For even greater retention, elongated nails or spikes 32 are driven through the apertures 23 and completely through the joist to be clinched over, as at 33, on the other side of the joist. If desired, large head spikes may also be driven through the aligned apertures 22 and clinched over, for additional retention.

Thus, it will be seen that the provision of the extensions 25 on the bracket 20 together with the fasteners positioned within the apertures 29 and 30 of the extensions provides a wide spread, lateral support for the bracket, and this lateral support resists any tilting or lateral displacement load which may be imposed upon the joist 14.

FIGS. 6 and 7 illustrate the brackets 15 of the present invention as utilized in connection with a railing structure for the deck. From FIG. 6, it will be seen that the deck floorboards 16 terminate in a vertical edge 35. A facing board or fascia 36 is secured to the edges 35 of the deck boards 16 to depend therefrom as a decorative facing for the deck and as a support for the rail structure. The fascia 36, where normal to the joist 14 is also secured to the joists, as shown in FIG. 6.

Brackets 15, as heretofore described, are utilized to secure the lower ends of vertical rails 38 to the boards 36. The lateral extensions 25 and the web 20 are in flatwise contact with the exposed face of the board 36, and bolts 39 are utilized to connect the rail to the boards 36. The vertical rails 38 are then interposed between the flanges 21 and are secured thereto preferably by bolts 40 positioned within bolt holes 22 of the flanges 21.

The upper ends of each of the rails 38 is secured to the upper railing 42 by means of the identical brackets 15, the brackets here being inverted so that the under surface of the web 20 and the lateral extensions 25 is positioned against the under surface of the rail 42 and secured thereto by suitable means, as by lag screws 43. The bracket then is attached to the upper ends of the rails 38, as by bolts 45 traversing the aligned bolt holes 22 in the flanges. Here again, the lateral support extensions 25 provide lateral stability for the post 38 and serve to retain the rail posts and railing 42 against displacement outwardly from the floor of the deck.

I claim:

1. A bracket for interconnecting two mutually perpendicular structural members, comprising:
    a central planar web;
    a pair of parallel planar flanges integral with said web and projecting therefrom to lie in planes substantially normal to that of said wall;
    one edge of each said flanges having cut therefrom, at the corner defined by its juncture with said web, an essentially rectangular support extension of appreciably less extent than one half the extent of its respective flange in both its height and breadth dimensions, so as to minimally detract from the support of one of said members throughout the full height and breadth dimensions of said flanges;
    each such extension being deflected from the plane of the respective flange to be co-planar with said central web.

2. A bracket as defined in claim 1, wherein:
    each flange has a fastener aperture in that corner thereof remote from said web and aligned with said support extension; and
    each flange has that corner thereof diagonally remote from said support flange removed;
    so that a fastener parallel to the web can enter the aperture, traverse the structural member interposed between said flanges, and overlie the other flange, by virtue of said removed flange corner, and can be clinched inwardly against the other flange.

* * * * *